United States Patent Office 3,394,686
Patented July 30, 1968

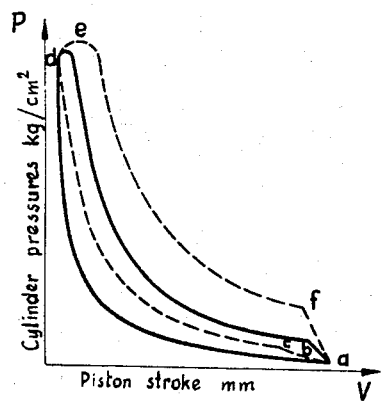
Fig. I
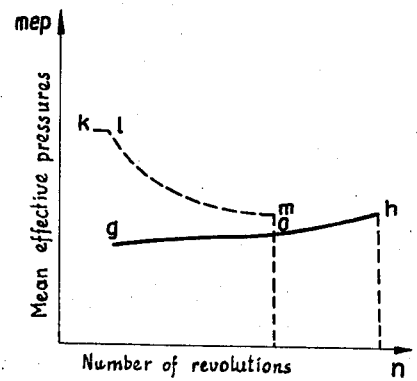
Fig. II
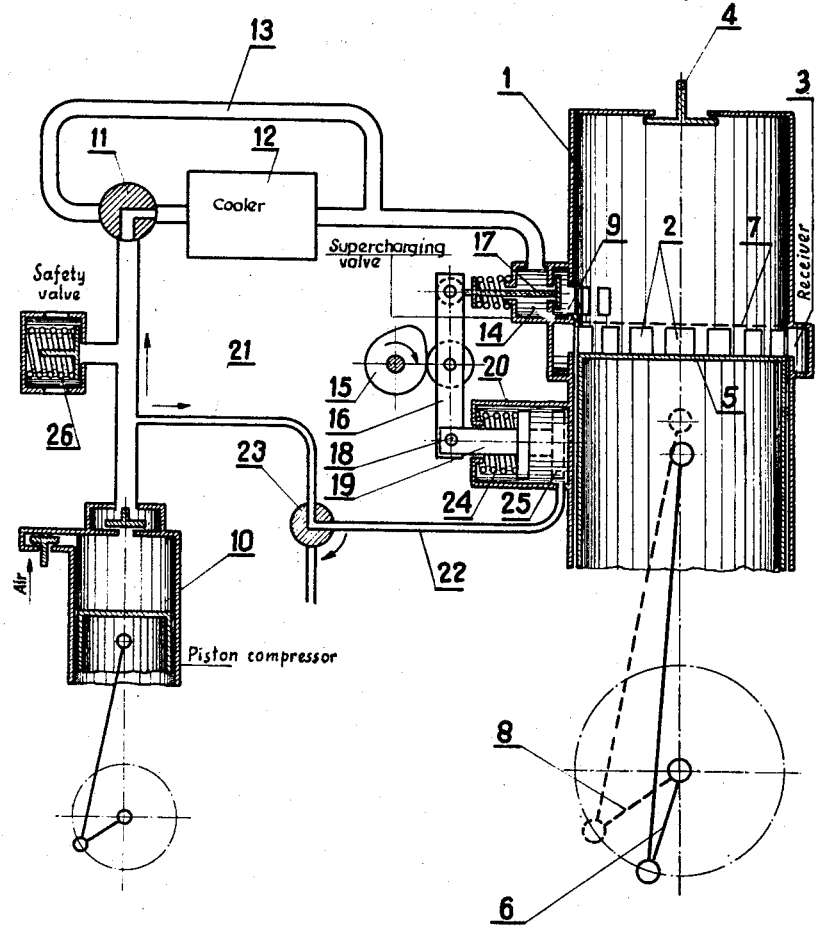
Fig. III

3,394,686
METHOD OF HIGH-LEVEL SUPERCHARGING FOR DIESEL ENGINES AND PRACTICAL APPLICATION THEREOF
Adam Kreglewski, ul. Slowackiego 21 m 4, and Witold Kreglewski, ul. Mila 4 m 2, both of Poznan, Poland
Filed Jan. 15, 1965, Ser. No. 425,771
Claims priority, application Poland, Jan. 16, 1964, P 103,471
6 Claims. (Cl. 123—119)

ABSTRACT OF THE DISCLOSURE

An apparatus is provided in which there is a cylinder with a piston displaceable therein. The cylinder has first and second axially spaced inlets, one of which admits air into the cylinder and is closed first during the compression stroke of the piston; an air compression device compressing air independently of the movement of the piston and a control couples this compression device to the cylinder via the second of the above-noted inlets. The control device transmits compressed air into the cylinder in accordance with the movement of the piston and inversely proportional to the speed of the piston. The control device includes a valve member controlling the flow of the compressed air and a cam which operates this valve member. The cam is driven by the piston. A lever is provided intermediate the cam and valve member and a support means supports this lever and is responsive to the compression device for withdrawing the cam to inactive position so that the second inlet can remain closed.

---

This invention relates to a new method and apparatus for supercharging diesel engines for the purpose of obtaining a high-level supercharging.

The application of this new method of engine supercharging may be especially useful for two-cycle engines applied as direct motive power on diesel locomotives. Any such engine should have very particular characteristics in view of the specific conditions of a railways operation. In fact, very high mean effective pressure values (MEP), beginning with possibly low engine speeds of $\frac{1}{20}$ to $\frac{1}{10}$ of the nominal engine speed, should be obtainable.

The possibility of obtaining MEP-values of about 15 to 20 kg./cm.$^2$ depends on the amount of combustion air available in the engine cylinder, i.e., on the suitable supercharging rate of the engine.

There are designs of two-cycle engines providing for two rows of intake ports, with the top row uncovered by the piston well before the exhaust ports are uncovered. In order to prevent an escape of exhaust gases into the supercharging air reservoir, the latter is temporarily cut off from the cylinder by means of automatic valves or vanes which do not open until the cylinder exhaust pressure drops below that of the supercharging air in the reservoir.

Well-known are designs providing for two sets of intake ports connecting the cylinder with two separate combustion air reservoirs. Also in this design an engine controlled valve is arranged above the top intake port set, and it is the duty of this valve to regulate the amount of air additionally supplied by a separate engine driven pump. This arrangement, no longer used in modern applications, was used for increasing the total volume in the cylinder at the start of the compression cycle. The air pump being driven by the engine at a constant pump/engine speed ratio, the amount of additional combustion air supplied per cylinder cycle is constant, and depends on the engine speed. This device was provided for the purpose of increasing the mean effective pressure value, particularly at high engine speeds, and, therefore, the section areas of valves and additional air intake ports had to be sufficiently large to prevent an undue increase of air-flow resistance as a function of engine speed.

An important feature of this invention is the method of supercharging diesel engines with compressed air fed by a compressor with an individual drive (i.e., not driven by the diesel supercharged) at a constant speed and at a constant air output, regardless of the diesel speed.

This equipment is supposed to give its full output at low diesel speeds and give a maximum of an additional cylinder charging at these low speeds. With increasing diesel speeds and a constant compressed air amount supplied by the compressor driven by means of an auxiliary engine the amount of air charged per cylinder cycle is inversely proportional to the diesel speed at a given moment. Thus the main diesel additional supercharging varies as a hyperbolic function of its momentary speed, similarly as does the amount of combustion air per main diesel cycle; also the mean effective pressure value obtained varies approximately as a hyperbolic function of the momentary main diesel speed in a speed range well below the nominal.

From the point of view of energy production this cooperation of a high-speed auxiliary engine driving a compressor at a constant speed, with a main diesel engine momentarily operating at a low and variable speed is similar to the operation of a pneumatic power transmission: At the expense of the auxiliary engine, a high-level and varibale supercharging of the main diesel engine is obtained, thus ensuring very high and variable MEP-values, particularly with the main engine running at low speeds. The engine torque is directly proportional to the MEP-value, i.e., it changes approximately as a hyperbolic function of the momentary main diesel speed with the supercharging according to the method herein described. This interrelation between the engine torque (and, at the same time, the drawing effort of a direct-drive diesel locomotive) and the engine speed (i.e., also the locomotive running speed) fully meets the needs of the railway's operation and reflects the relation between the running resistance and the train running speed in the lower speed range.

The arrangement here described forms an additional equipment for a diesel engine, e.g., a direct-drive locomotive traction diesel, independent of the normally operating turbo-charger and the compressed-air starting equipment. The intake port for the additional air charged into the cylinder is located immediately over the sets of intake ports of a two-cycle engine. This additional air is being charged until the port is covered by the piston. The charging air must be fed into the cylinder under a pressure well in excess of that inside the cylinder at the moment of the port's being covered by the piston, e.g., at 4 to 5 atmospheres overpressure. This additional charging is initiated by the opening of a special supercharging valve controlled by the engine. The additional supercharging equipment must be fitted with a safety valve for the purpose of limiting the supercharging air pressure at particularly low engine speeds. Another feature of this invention is its pneumatic control. As the equipment for the additional supercharging is intended to operate in principle at low engine speeds, at which it is particularly effective, the possibility of cutting out this additional supercharging at high engine speeds has been provided. If necessary, the equipment can be kept in operation throughout the engine speed range, e.g., in overload conditions. The additional supercharging equipment is put in operation by filling with compressed air the auxiliary cylinders arranged at each of the engine cylinders. This compressed air operates the pistons connected with the fulcrums of the levers opening the supercharging valves by means of cams. This supercharging equipment is put out of operation by venting the auxiliary cylinders. This makes the pistons recede under the load of the springs built into the cylinders; as a result of the levers fulcrum displacement, the contact between the cams and the lever rollers is lost and the supercharging valves are not opened.

The auxiliary cylinders are filled with compressed air supplied by the same compressor which feeds the additional combustion air. Thus the control system ensures that the additional supercharging is cut off with a drop of pressure inside the piping of the additional supercharging equipment (e.g. in result of a break-down in the auxiliary engine, compressor a.s.c.)

The essential features of the invention are shown in the drawing wherein:

FIG. I is a P–V diagram illustrating characteristics of known two-cycle diesels, and also with the application of the additional supercharging of the invention;

FIG. II gives the respective MEP-values as functions of the engine speed; and

FIG. III is a diagrammatic showing of the equipment.

In FIG. I the continuous line indicates a P–V relation for a two-cycle diesel, while the intermittent line $a$–$b$–$c$–$d$–$e$–$f$–$a$ shows these values with an additional supercharging applied at the $b$–$c$ interval which results, in this example, in an approximately 100 percent increase of the cylinder charge.

FIG. II gives the relation between the available MEP-values and the engine speed: the continuous $g$–$o$–$h$ line refers to a normally supercharged diesel, while the intermittent $k$–$l$–$m$–$o$ line is an example of such a relation with the application of an additional supercharging featured by a constant combustion air supply regardless of the main engine speed. The horizontal section $k$–$l$ depicts the operation of the safety valve limiting the supercharging pressure (at "$c$" in FIG. I) with the main diesel running at a particularly low speed. The $m$–$o$ offset indicates the cutting-off of the additional supercharging at a definite engine speed, in this example fixed below the engine nominal speed (abscissa for the point "$h$").

In FIG. III an example of the arrangement of the additional supercharging equipment for a two-cycle diesel engine is shown. The cylinder 1 of the additionally supercharged engine is provided with a set of intake ports 2 through which the air for scavenging the cylinder or renewing its charge is supplied, for instance, from a turbo-charger, into the space 3. The combustion gases escape from the cylinder via a controlled outlet valve 4. The piston 5 of the cylinder is connected to the crank gear 6. Intermittent lines have been used to show the position of the top edges of the piston 7 and that of the crank gear 8 just when the inlet port 9 for the additional supercharging air from an independent compressor 10 is being closed (this corresponds to the point "$c$" in the diagram in FIG. I). The additional combustion air from this compressor flows through a 3-way cock 11 and it can be directed towards the engine either through the cooler 12, or short-circuited via the line 13; this shunting of the air cooling may be desirable to ensure self-ignition at extremely low engine speeds. Next to the cylinder 1 of the engine there is the supercharging valve 14 operated by the cam 15 which, in turn, is driven from the engine crank shaft 6 at a speed ratio of 1 to 1. The cam impulses are transmitted to the valve 14 by the valve member 17. The valve 14 should be opened just at the moment when the intake ports 2 are being covered by the piston 5—this corresponds to the point "$b$" in the diagram in FIG. I. The fulcrum 18 of the lever 16 is arranged on the piston rod 19 of the auxiliary air cylinder 20. Through the pipes 21 and 22 fitted with the valve 23, compressed air is fed into the cylinder 20 to apply a force to the piston 19, sufficient to compress the spring 24 and throw the lever 16 into its operating position. By turning the valve 23 through 90° in the direction of the arrow the compressed air flow is cut off, and the pipe 22, together with the cylinder 20, is vented. Acting under the load of the spring 24, the piston 19 recedes to its position at 25 shown in intermittent lines, bringing the lever 16 into its neutral position in which the valve 14 cannot be opened. By means of the safety valve 26 the maximum supercharging air pressure is limited to a value compatible with the engine safety; this limitation is particularly necessary with the engine running at very low speeds.

The method of this additional supercharging of a two-cycle diesel engine with intake ports can be also adopted, with suitable modifications, for internal combustion engines of other types.

What we are claiming is:

1. Apparatus comprising a cylinder, a piston displaceable in said cylinder, said cylinder being provided with first and second axially spaced inlets the first of which admits air into the cylinder and is the first closed during the compression stroke of said piston, air compression means for compressing air independently of the movement of said piston, and control means coupling said compression means to said cylinder via said second inlet and transmitting the compressed air into the cylinder in accordance with the movement of said piston and inversely proportional to the speed thereof.

2. Apparatus as claimed in claim 1 wherein said control means includes a valve member controlling the flow of the compressed air and a cam operating said valve member and driven by said piston.

3. Apparatus as claimed in claim 2 comprising a lever intermediate said cam and valve member and support means supporting said lever in position to be engaged by said cam, said support means being responsive to said compression means for withdrawing the cam to inactive position whereby said second inlet remains closed.

4. Apparatus as claimed in claim 3 wherein said control means includes, between said compression means and second inlet, parallel direct and cooling circuit means and means to select one of said circuit means for operation.

5. Apparatus as claimed in claim 4 comprising means for venting said control means when air pressure therein exceeds a predetermined maximum.

6. A method comprising charging a diesel cylinder with air and subsequently supercharging the cylinder with air compressed independently of the speed of operation of the diesel, the supercharging being effected at a rate dependent on said speed of operation, the amount of supercharged air supplied being inversely proportional to said speed.

References Cited
UNITED STATES PATENTS

| 2,581,334 | 1/1952 | Reggio | 123—119 |
| 2,583,882 | 1/1952 | Ricardo | 123—119 |
| 2,924,069 | 2/1960 | Buchi | 123—119 X |

RALPH D. BLAKESLEE, *Primary Examiner.*